G. R. KACSMARIK.
SLIDE REST.
APPLICATION FILED JAN. 10, 1912.

1,036,257.

Patented Aug. 20, 1912.

WITNESSES

INVENTOR
Gustave R. Kacsmarik
BY
ATTORNEYS

UNITED STATES PATENT OFFICE.

GUSTAVE R. KACSMARIK, OF NEW YORK, N. Y.

SLIDE-REST.

1,036,257.  Specification of Letters Patent.  Patented Aug. 20, 1912.

Application filed January 10, 1912.  Serial No. 670,396.

*To all whom it may concern:*

Be it known that I, GUSTAVE R. KACSMARIK, a subject of the King of Hungary, and a resident of the city of New York, borough of Manhattan, in the county and State of New York, have invented a new and Improved Slide-Rest, of which the following is a full, clear, and exact description.

The invention relates to lathes used by jewelers and other persons, and its object is to provide a new and improved tool slide rest arranged to permit universal adjustment of the tool relative to the work.

For the purpose mentioned use is made of a spindle mounted to turn in the tool post and provided with a horizontally-disposed guideway on which is mounted to slide a head for carrying the tool, the said head being engaged by a screw rod journaled on the guideway. Use is also made of a tool-adjusting screw rod screwing in the head and arranged parallel to the tool, the said tool-adjusting screw rod being provided with a collar engaging a recess in the tool for shifting the latter in the direction of its length on screwing the said tool-adjusting screw rod inward or outward in the head.

A practical embodiment of the invention is represented in the accompanying drawings forming a part of this specification, in which similar characters of reference indicate corresponding parts in all the views.

Figure 1:
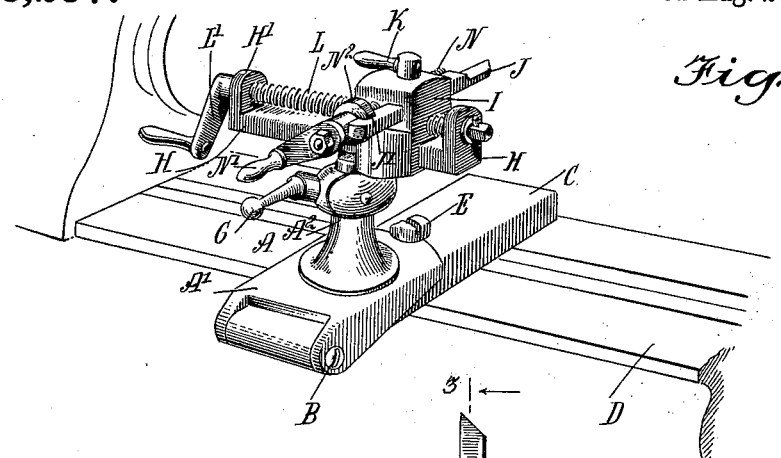
Figure 2:
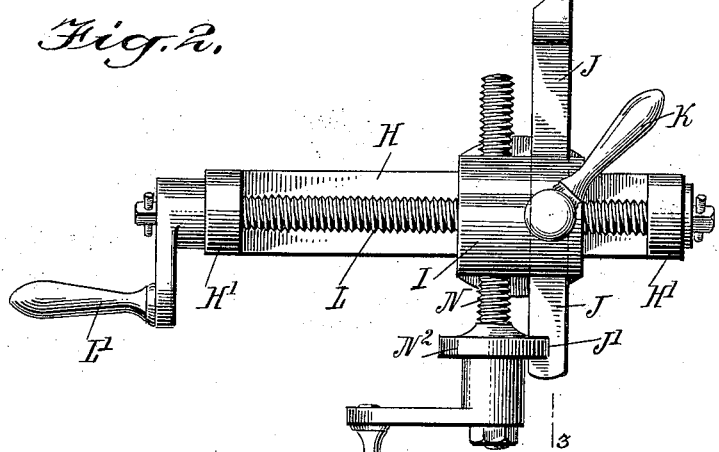

Figure 1 is a perspective view of the slide rest in position on the lathe; Fig. 2 is a plan view of the tool holder; and Fig. 3 is a transverse section of the same on the line 3—3 of Fig. 2.

The tool post A is pivotally connected at the front of its base A' by a pivot B with a support C adjustably attached to the bed D of the lathe, the said base A' being normally locked in place on the support C by a screw E screwing in the support C and having its head extending over the top of the base A'. A portion of the head of the screw E is cut off so that when the screw E is turned to bring its flat face into a forward position then the base A' is unlocked and the tool post can be swung over and with it the parts supported thereby, to permit of swinging the tool post and parts carried thereby out of the way whenever it is desired to use the lathe without the tool post.

The tool post A is provided with a vertically-disposed split socket or bearing $A^2$ in which is mounted to turn a spindle F adapted to be fastened in place in the bearing $A^2$ by clamping split portions in firm contact with the spindle F, the portions being engaged by a handled screw G to open or close the split sections.

Figure 3:
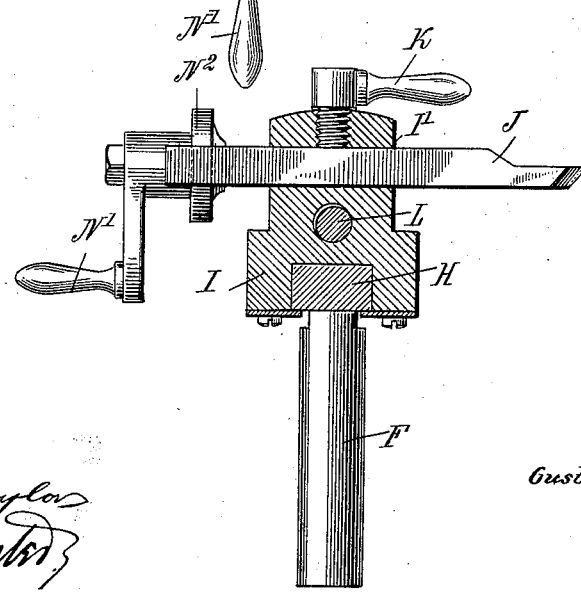

On the upper end of the spindle F is secured a horizontally-disposed guideway H on which is mounted to slide a head I provided with an opening I' at right angles to the guideway H and adapted to receive the tool J fastened in place in the head I by a handled screw K, as plainly indicated in Fig. 3. In the head I screws a screw rod L journaled in lugs H' extending upwardly at the ends of the guideway H, and on one end of the screw rod L is secured a handle L' under the control of the operator for turning the screw rod L with a view to shift the head I and with it the tool J lengthwise of the guideway H.

In order to shift the tool J in the head I after the tool is unlocked by the screw K, use is made of a screw rod N arranged parallel to the tool J and screwing in the head I. The outer end of the screw rod N is provided with a handle N' under the control of the operator for turning the screw rod N, and on the latter is secured or formed a collar $N^2$ engaging a recess J' formed in the rear end of the tool J. Thus when the screw rod N is screwed inward or outward in the head I a corresponding sliding movement is given to the tool J as the latter is carried along by the collar $N^2$ engaging the recess J'.

From the foregoing it will be seen that by the arrangement described the spindle F can be readily turned in the bearing $A^2$ of the tool post, the head I carrying the tool J can be adjusted lengthwise on the guideway H and the tool J can be adjusted transversely in the head I by the screw rod N. Thus by the arrangement described, the operator is enabled to readily bring the cutting end of the tool into the desired position relative to the work, the tool J may be fed inward on turning the handle N', and the tool J can be bodily fed on the operator turning the handle L'.

It is understood that in slide rests as now generally constructed two or more slides are employed, whereas in the slide rest herein shown and described but one slide is employed, and hence the device is greatly simplified.

Having thus described my invention, I claim as new and desire to secure by Letters Patent:

1. A slide rest for the tool posts of lathes, comprising a spindle mounted to turn in the tool post, a horizontal guideway attached to the upper end of the said spindle, a head mounted to slide on the said guideway and adapted to carry the tool, a head-adjusting screw rod journaled on the said guideway and screwing in the said head for adjusting the latter on the guideway, and a second screw rod screwing in the said head and arranged at a right angle relative to the said guideway, the said second screw rod having means for engagement with the tool to slide the latter in the direction of its length.

2. A slide rest comprising a tool post, a base on which the said tool post is mounted to swing in a vertical plane, means for fastening the tool post to the base, a vertical spindle mounted to turn in the said tool post, a guideway fixed on the upper end of the said spindle and provided at its ends with upturned lugs, a tool-carrying head mounted to slide on the said guideway, and a screw rod journaled on the said lugs and screwing in the said head.

3. A slide rest, comprising a tool post, a base on which the said tool post is mounted to swing, means for fastening the tool post to the base, a vertical spindle mounted to turn in the said tool post, a guideway fixed on the upper end of the said spindle and provided at its ends with upturned lugs, a tool-carrying head mounted to slide on the said guideway and provided with an opening for the tool, the said opening extending at a right angle relative to the said guideway and screw rod, and a second screw rod screwing in the said head and arranged parallel to the said opening, the said second screw rod having a collar adapted to engage a recess in the tool.

4. A slide rest, comprising a tool post, a base on which the said tool post is mounted to swing, means for fastening the tool post to the base, a vertical spindle mounted to turn in the said tool post, a guideway fixed on the upper end of the said spindle and provided at its ends with upturned lugs, a tool-carrying head mounted to slide on the said guideway and provided with an opening for the tool, the said opening extending at a right angle relative to the said guideway and screw rod, a second screw rod screwing in the said head and arranged parallel to the said opening, the said second screw rod having a collar adapted to engage a recess in the tool, and a clamping screw screwing in the said head and adapted to engage the said tool.

In testimony whereof I have signed my name to this specification in the presence of two subscribing witnesses.

GUSTAVE R. KACSMARIK.

Witnesses:
 EDWARD A. SWEET,
 ROBERT STEADELE.

---

Copies of this patent may be obtained for five cents each, by addressing the "Commissioner of Patents, Washington, D. C."